Feb. 24, 1959  E. B. McMILLAN  2,875,435
ELECTROMAGNETIC WAVE ABSORBING DIELECTRIC WALLS
Filed Aug. 18, 1953

INVENTOR:
Edward B. McMillan

United States Patent Office 2,875,435
Patented Feb. 24, 1959

2,875,435

ELECTROMAGNETIC WAVE ABSORBING DIELECTRIC WALLS

Edward B. McMillan, Ipswich, Mass.

Application August 18, 1953, Serial No. 375,041

7 Claims. (Cl. 343—18)

The present invention relates to an absorption device and more particularly to an electromagnetic-wave-absorbing dielectric wall.

Two commonly used wall constructions for absorbing electromagnetic waves are the three-layer, quarter-wave Salisbury screen and the two-layer quarter-wave wall. The first comprises a dielectric spacer having on its surface toward the incident radiation a semi-conductive dielectric layer and on the opposite surface an opaque reflective layer, the thickness of the two dielectric layers having a critical adjustment so that the total effective thickness is a quarter-wave length at a desired angle of incidence and frequency. The two-layer quarter-wave wall comprises a reflective opaque layer having on its surface toward the source of radiation a dielectric layer requiring an extremely critical adjustment so as to be a quarter-wave length thick at a predetermined angle of incidence and frequency. The thickness of the Salisbury screen and the narrowness of the operative ranges of angle of incidence and frequency of the two-layer quarter-wave wall have greatly limited their usefulness.

An object of the present invention is to provide a thin, non-critical electromagnetic-wave-absorbing dielectric wall having low reflection.

Another object of the present invention is to provide an electromagnetic-wave-absorbing wall having low reflection over a wide range of angles of incidence and frequency.

In accordance with the present invention, I provide an electromagnetic-wave-absorbing dielectric wall, having low reflection over a wide range of angles of incidence and frequency, in which a reflecting surface is combined with dielectric layers interposed between it and an electromagnetic-wave source. These dielectric layers, which are disposed on the face of the reflecting surface, include a high-loss layer, separated from the reflective surface by a dielectric spacing layer, and a high-refractive-index layer on the side of the high-loss layer nearest the electromagnetic-wave source. The high-refractive-index layer is effective to "tune" the combination by control of its thickness and refractive index.

The invention will be further described in connection with the drawings, of which:

Figure 1:
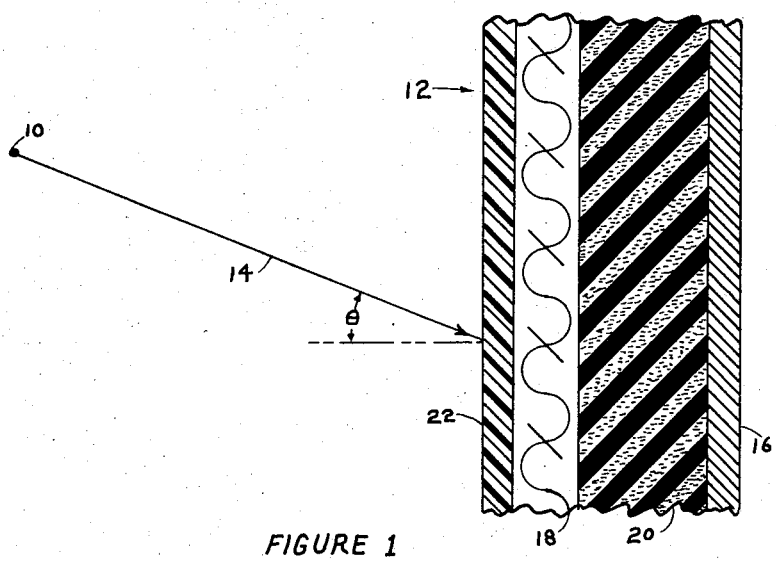
Figure 1 is a schematic view of the absorbing wall in section.

Figure 1 shows a source of radiation 10 and my new dielectric wall, indicated generally at 12, disposed across its path 14 at an angle of incidence $\theta$. The absorbing wall 12 includes a reflecting layer 16, a high-loss layer 18, a dielectric spacing layer 20, and a high-refractive-index dielectric tuning layer 22.

The reflecting layer 16 provides a well defined termination at the back of the absorbing wall 12. The reflecting layer 16 and the dielectric tuning layer 22 serve to enhance wave trapping so that energy which has entered the absorbing wall 12 will undergo internal multiple reflection until much is dissipated by the high-loss layer 18. Both layers 16 and 22 may have mechanical properties such as rigidity or tensile strength so that the absorbing wall 12 may perform some structural function. For use in the radio and microwave frequency ranges, the reflecting layer 16 may be made of materials such as sheet metal, aluminum foil and wire screen if reflecting layer 16 is to be opaque. If it is to be transmissive, among the suitable materials are sheet polystyrene and glass-fiber-reinforced low-pressure laminating resin. For use at higher frequencies, many known materials having reflective properties in the broad electromagnetic-wave spectrum will be found suitable.

The high-loss layer 18 is the principal layer that absorbs the power. Its thickness can be inversely proportional to its loss tangent, and its loss is so high that its refractive index is small by comparison. Suitable materials for it for use in the radio and microwave ranges are conductive carbon-loaded synthetic or natural rubber, conductive carbon-loaded inorganic cement, polyelectrolyte adhesive, and ethylene-glycol-plasticized rubber or vinyl plastic. At wavelengths of 1–15 microns, semi-conductors such as copper sulfate hydrates can be used, while from 50–300 microns, ordinary glass or hardened waterglass loaded with soot are suitable.

The dielectric spacing layer 20 places the high-loss layer 18 away from the reflective layer 16 in a region of non-zero electric field and the dielectric tuning layer 22 far enough away so that internal energy may be trapped and propagated in the absorbing wall 12 until dissipated. In a structural function, dielectric spacing layer 20 will provide heat and sound insulation if it is cellular and may be used as a structural sandwich core. Among suitable materials for the spacing layer to be operated in the radio and microwave ranges are hard or soft foam rubber, inorganic cement foamed or filled with exploded mica, wood, and glass-fiber-reinforced plastic, or the spacing may be simply air. In the infra-red range, one can use a material such as polytrifluoro-chlorethylene.

The high-refractive-index dielectric tuning layer 22 tunes the other layers 16, 20 and 18 so that the absorbing wall 12 will be characterized by low reflection over a wide range of angles of incidence and frequencies on each side of the design frequency. In order to tune the other layers, layer 22 produces reflections equal to and opposite in phase from the reflections coming to it from them. Its magnetic permeability must be low in the frequency range in which it is to be used when the reflecting surface 16 also has low magnetic permeability. Among suitable high-refractive-index materials for use in the radio and microwave ranges are barium strontium titanate and titanium-dioxide ceramic sheet, and copper, aluminum, or titanate particles loaded into synthetic or natural rubber, vinyl sheeting, or glass-fiber-reinforced plastic. In the infra-red region, high-refractive-index loaded fluorides are suitable. In actual practice, it has been found beneficial to roughen the surface of the dielectric tuning layer 22 on the side toward the source of radiation 10.

Figure 2:
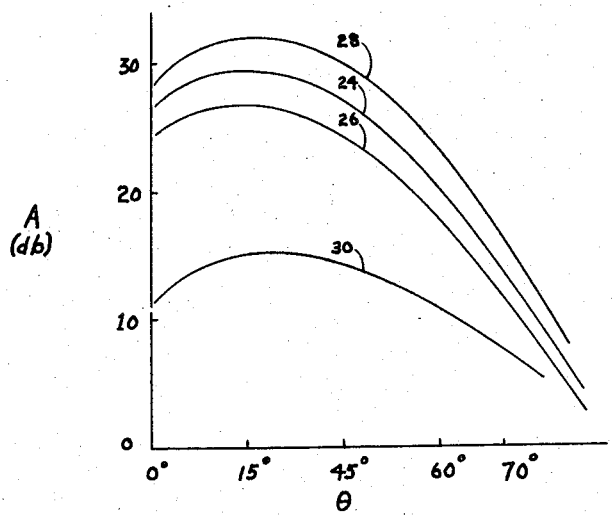
Figure 2 is a graph comparing the performance of the wall of the present invention with that of a two-layer quarter-wave absorbing wall.

Figure 2 shows the performance of a microwave-radiation absorber according to my invention. The vertical coordinate A represents absorbed power in decibels, and the horizontal coordinate $\theta$, angle of incidence, in degrees. Curves 24, 26 and 28 plot the variation in absorbed power of a typical absorber of my invention at 9375, 8750, and 10,000 megacycles, respectively, while curve 30 plots the performance at 9050 megacycles of an actual two-layer quarter-wave absorber optimized for 9350 megacycles according to prior art.

The relation between the refractive index $\alpha$ and optimum thickness of the high-refractive-index dielectric tuning layer, the thickness $t$ and loss tangent $\tan \delta$ of the high-loss layer, and the refractive index $\epsilon$ and thickness $d$ of the dielectric spacing layer, when the reflecting surface is metallic and the dielectric tuning layer is of low magnetic permeability is as follows, where:

$\lambda$ is the wave length of the incident radiation,
$\Omega$ is the equivalent resistance, in ohms per square, of the high-loss layer,
$K$ is the refractive index of the high-loss layer,
$\phi$ is the electrical electromagnetic-wave thickness of the dielectric spacing layer, and $$s = \frac{377}{\Omega}$$

*Equation 1*

$$\frac{4\pi x \alpha}{\lambda} - \tan^{-1} \frac{(s\gamma - s + 2) \sin 2\phi}{2\gamma + s\gamma - s - (s\gamma - s + 2)} \cos 2\phi + \tan^{-1} \frac{(s + 2\gamma - s\gamma) \sin 2\phi}{2 + s - \gamma s - (s + 2\gamma - \gamma s)} \cos 2\phi = 2n\pi$$

where $n$ is any integer, $$\gamma = \frac{\alpha - 1}{\alpha + 1}$$

$$\phi = \frac{2\pi d \epsilon}{\lambda}$$

and $$\Omega = \frac{60\lambda}{tk^2 \tan \delta}$$

When $\Omega = 377$, the minimum reflection coefficient $R^2$ is substantially given by

*Equation 2*

$$R^2 = \left[ \frac{1}{2\alpha^2 \tan^2 \frac{2\pi d \epsilon}{\lambda}} \right]^2$$

in power, if $\alpha^e \gg 1$

The dimensions and electromagnetic properties of the reflecting surface, the high-loss layer, and the dielectric spacing layer may be varied, and the resultant of their reflections from all of their interfaces as evidencing itself at the interface of the high-loss layer with the dielectric tuning layer may be determined by previously known electromagnetic-wave mathematical procedures. If the reflecting surface, the high-loss layer, or the dielectric spacing layer, has arbitrary properties or properties of high magnetic permeability not covered by Equation 1, then the requirement that the dielectric tuning layer have low magnetic permeability is removed. The condition of the present invention is met if:

*Equation 3*

$$\cos w' + w \frac{\alpha^2 + 1}{\alpha^2 - 1} = 0$$

where: $w$ is the amplitude reflection coefficient of said resultant of the reflections from all other interfaces of the absorbing wall of our invention, and $w'$ is its phase.

This shows that $\alpha$, the refractive index of the dielectric tuning layer must be large. The optimum thickness $x$ of the dielectric tuning layer then can be determined as follows:

*Equation 4*

$$\frac{4\pi x \alpha}{\lambda} + \tan^{-1} \frac{\omega(1 - \gamma^2) \sin \omega'}{\gamma(1 + \omega^2) + \omega(1 + \gamma^2) \cos \omega'} = 2n\pi$$

where $$\gamma = \frac{\alpha - 1}{\alpha + 1}$$

Thus according to the present invention, I can use my dielectric tuning layer to tune an arbitrary absorber meeting the conditions of Equation 3.

The following is an example of a microwave absorber according to the present invention:

The reflective layer 16 consisted of a layer of aluminum foil .002 inch thick.

The dielectric spacing layer 20 was a foamed, flexible, cured natural rubber having a refractive index of 1.2 substantially and a thickness of .080 inch.

The high-loss layer 18 was a 377-ohm-per-square composition .018 inch thick comprising substantially 49 weight parts of conductive channel black fired at 2000 degrees C. in 100 weight parts of a natural rubber broken down for calendering, calendered into an open-weave cotton fabric and cured.

The high-refractive-index low-magnetic-permeability layer 22 comprised a coating of the following composition, calendered onto the front surface of the high-loss layer 18 and cured so as to have a refractive index of 90 and to be .007 inch thick:

| | Grams |
|---|---|
| Polychlorobutadiene latex (50% solids) | 900 |
| Phenyl beta napthylamine dispersion (40% solids) | 22.5 |
| Zinc oxide dispersion (50% solids) | 45 |
| Sulfur dispersion (73% solids) | 8 |
| Dithiocarbamate dispersion (50% solids) | 12 |
| Sodium sulfates of higher fatty alcohols | 3 |
| Aluminum powder slurry | 450 |
| Sodium acrylate polymer emulsion (40% solids) | 75 |

The aluminum-powder slurry had the following composition:

| | Grams |
|---|---|
| Water | 1000 |
| Methyl cellulose, 15 centipoises, 10% solution | 30 |
| Aluminum extra fine lining powder | 354 |
| Non-ionic wetting agent | 1 |

When this microwave absorber was tested, it yielded the performance shown in Figure 2.

For the purpose of describing my invention, a specific embodiment and certain materials have been illustrated, but it is to be understood that the invention is not to be limited thereto, since it is evident that such other embodiments and materials are contemplated as are within the spirit and scope of the invention.

What I claim is:

1. An electromagnetic-wave-absorbing dielectric wall for disposition in the path of electromagnetic waves to be absorbed comprising a reflective layer, a low refractive index spacing layer on a side of said-reflective-layer, a high-loss dielectric layer, and an outer tuning layer, said tuning layer being of a different dielectric from said high-loss layer and having a high refractive index relative to said spacing layer and a low loss relative to said high-loss layer, and said tuning layer having a combination of electrical thickness and refractive index providing a vector sum of zero for reflections from its surface on the side toward the electromagnetic-wave source and the resultant of the reflections from all other interfaces of said wall at a predetermined angle of incidence and electromagnetic wave length.

2. An electromagnetic-wave-absorbing dielectric wall as defined in claim 1 wherein said spacing layer is foam rubber.

3. An electromagnetic-wave-absorbing dielectric wall for disposition in the path of electromagnetic waves to be absorbed, comprising in order a reflective layer, a low-refractive-index spacing layer, a high-loss dielectric layer having a resistivity of substantially $$\frac{60\lambda}{tK^2 \tan \delta}$$

where $\lambda$ is the wavelength, $t$ is the thickness, $\tan \delta$ is the loss tangent and $K$ is the refractive index of the high-loss layer, and an outer tuning layer, said tuning layer being of a different dielectric from said high-loss layer and having a high refractive index relative to said spacing layer and a low loss relative to said high-loss layer, the effective electrical path through the high-loss dielectric layer and said spacing layer being other than a multiple of a quarter wavelength, and said tuning layer having an effective electrical thickness cooperating with the effective electrical thickness of said high-loss and spacing layers to provide an effective electrical path through said tuning, high-loss and spacing layers of an odd multiple of a quarter wavelength, providing a vector sum of zero for reflections from the tuning-layer surface on the side toward the electromagnetic wave source and the resultant of the reflections from all other interfaces of said wall at a predetermined angle of incidence and electromagnetic wavelength.

4. An electromagnetic-wave-absorbing dielectric wall as defined in claim 3, in which the electromagnetic wave thickness and refractive index of said tuning layer are determined by the following equation:

$$\frac{4\pi x\alpha}{\lambda}+\tan^{-1}\frac{\omega(1-r^2)\sin\omega^1}{r(1+\omega^2)+\omega(1+r^2)\cos\omega^1}=2n\pi$$

where $$r=\frac{\alpha-1}{\alpha+1}$$

and where $n$ is any integer,
$x$ is the thickness of said tuning layer,
$\alpha$ is the refractive index of said tuning layer,
$\lambda$ is the wavelength of said electromagnetic wave,
$\omega$ is the amplitude reflection coefficient of said resultant of the reflections from all other interfaces of said wall, and
$\omega'$ is its phase.

5. An electromagnetic-wave-absorbing dielectric wall comprising, in order, a reflective surface disposed transversely across the path of electromagnetic waves to be absorbed, a dielectric spacing layer, a high-loss dielectric layer including conductive carbon particles distributed in a dielectric medium, and a high-refractive-index dielectric tuning layer including aluminum powder distributed in a dielectric medium.

6. An electromagnetic-wave-absorbing dielectric wall comprising, in sequence toward the source of electromagnetic waves, a reflective surface disposed transversely across the path of the electromagnetic waves to be absorbed, a dielectric spacing layer, a high-loss layer, and a high-refractive-index dielectric tuning layer, said dielectric tuning layer having a high refractive index relative to said dielectric spacing layer and a low loss relative to said high-loss layer.

7. An electromagnetic-wave-absorbing dielectric wall comprising, in sequence, a reflective surface, a dielectric spacing layer, a high-loss layer, and a high-refractive-index dielectric tuning layer, said dielectric tuning layer having a high refractive index relative to said dielectric spacing layer and a low loss tangent relative to said high-loss layer.

References Cited in the file of this patent
UNITED STATES PATENTS

| | | |
|---|---|---|
| 2,599,944 | Salisbury | June 10, 1952 |
| 2,656,535 | Neher | Oct. 20, 1953 |